United States Patent Office 2,742,453
Patented Apr. 17, 1956

2,742,453

POLYHYDROXYPOLYALKYLENEPOLYUREAS

Robert W. Auten, Jenkintown, and Robert S. Yost, Oreland, Pa., assignors to Rohm & Haas Company, Philadelphia, Pa., a corporation of Delaware No Drawing. Application July 22, 1952,
Serial No. 300,361

10 Claims. (Cl. 260—77.5)

This invention deals with polyhydroxypolyalkylenepolyureas and with a process for their preparation.

These compounds are formed from alkylene polyamines by reacting a said polyamine with an epihalohydrin to form a polyhydroxypolyalkylenepolyamine and reacting this product with urea.

It has been proposed to react alkylene polyamines and epichlorohydrin in excess to form insoluble products which were suitable as anion-exchange resins. In contrast thereto this invention is concerned with reacting a said polyamine and an epihalohydrin to form soluble reaction products which can be converted to polyureas.

For the preparation of initial condensates required for this invention there may be used any alkylene polyamine or mixture of alkylene polyamines having alkylene chains of two to three carbon atoms. Typical of these are ethylenediamine, propylenediamine, trimethylenediamine, diethylenetriamine, dipropylenetriamine, triethylenetetramine, N,N'-di(aminoethyl)propylenediamine, tetraethylenepentamine, pentaethylenehexamine, or the like. These polyamines may be represented by the formula

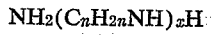

$$NH_2(C_nH_{2n}NH)_xH$$

where $n$ has a value of two to three and $x$ is an integer from one upwards, being usually not over 12.

One or more of these polyamines is reacted with epichlorohydrin or epibromohydrin at a temperature between about 0° and 100° C. Reaction may be carried out by mixing the two reactants in proper proportion and heating the mixture. Mixing and heating are best accomplished in the presence of an inert volatile solvent, such as water or a short chained, saturated monohydric aliphatic alcohol. The presence of solvent is desirable to moderate the reaction and ensure soluble reaction products.

But more important in this regard is the ratio of alkylene polyamine to epihalohydrin. There should be used at least one mole of epihalohydrin per mole of polyamine up to about 1.4 moles of epihalohydrin per mole of polyamine, the proportions in any case being selected to yield soluble reaction products under the conditions of reaction, particularly with respect to solvent, concentration, temperature, time, and the like. The optimum ratios vary somewhat with the particular polyamine. For example, with ethylenediamine the optimum ratios are 1.0:1 to 1.2:1, with diethylenetriamine 1.1:1 to 1.3:1, with triethylenetetramine 1.2:1 to 1.4:1, and with tetraethylenepentamine 1.0:1 to 1.25:1.

The reaction between alkylene polyamine and epihalohydrin is continued until complex polyhydroxypolyalkylenepolyamines are formed in molecular sizes sufficient to impart some degree of viscosity to solutions thereof.

For purposes of this invention the reaction is carried on until an aqueous solution containing about 46% of polyamine reaction product solids has a viscosity from J to $Z_7$ on the Gardner-Holdt scale at 25° C. Preferably the reaction products at 46% polyamine solids in water impart a viscosity to the solution from T to $Z_4$ on the Gardner-Holdt scale.

This product is formed in the reaction mixture as a hydrohalide. It is best to react the hydrohalide with a base to take up the hydrogen halide and liberate the free polyhydroxypolyalkylene polyamine. For this purpose there may be used sodium or potassium hydroxide or sodium or potassium carbonate or bicarbonate or combinations of these reagents. The sodium or potassium halide which results may be left in the reaction mixture. If desired, free polyhydroxypolyalkylenepolyamine and alkali metal halide may be separated by extracting the former with a volatile, aliphatic alcohol, such as methanol, ethanol, or isopropanol.

The polyhydroxypolyalkylenepolyamine is now reacted with urea. This may be done by driving off solvent from the said polyamine and fusing it with urea. Alternatively a concentrated solution of said polyamine is heated with urea, pressure being used if necessary to effect the desired reaction. Ammonia is liberated and is taken off. Absorption of the ammonia provides a convenient way to follow the reaction.

Temperatures for reaction of a said polyamine and urea lie between 100° and 200° C. The evolution of ammonia begins between 100° and 110° C. and continues slowly at this level. Raising the temperature considerably accelerates the reaction. A temperature range from 110° to 160° C. is preferred.

There should be used in general about one mole of urea per reactive —NH— group of the polyhydroxypolyalkylenepolyamine. Somewhat less urea may, however, be used with free —NH— groups remaining in the product, but a marked deficiency of urea allows side reactions to occur. Excess urea does no harm, usually remaining in the reaction mixture and apparently reacting with hydroxy groups. It is then desirable to use from 0.5 to 1.8 moles of urea per —NH— group of said polyamine.

The desired polyureas are obtained when the reaction mixture imparts to an aqueous solution thereof at 45% polyurea solids a viscosity from B to $Z_3$ at 25° C. on the Gardner-Holdt scale. The preferred state is reached when such 45% solution has a viscosity from F to Z.

The polyureas are useful as intermediates for preparing methylol derivatives which are valuable condensates for use in such diverse fields as coatings, adhesives, textiles, and paper manufacture. The polyureas of this invention are also useful as coreactants with urea and/or melamine and formaldehyde to give cocondensates with many desirable properties. They may be added to urea-formaldehyde condensates to react with excess or free formaldehyde therein.

Typical preparations of polyureas are described in the following illustrative examples.

Example 1

A reaction vessel equipped with stirrer, thermometer, reflux condenser, and dropping funnel was charged with 292 parts by weight of triethylenetetramine and 392 parts by weight of water. The vessel was cooled to about 15° C. and kept below 20° C. while 254 parts by weight of epichlorohydrin were slowly added. When addition of epichlorohydrin was completed, cooling of the reaction vessel was discontinued. The temperature of the reaction mixture slowly rose to 60° C. The mixture was then stirred and heated on a steam bath for four hours. The resulting product was a solution of polyhydroxypolyalkylenepolyamine hydrochloride. This solution had a Gardner-Holdt viscosity of about $Z_3$.

There were mixed 150 parts by weight of this solution and 34.8 parts of aqueous 50% sodium hydroxide solution. To the resulting solution urea was added in an amount of 146.4 parts. The mixture was warmed under reduced pressure while 27 parts of water were stripped off. The mixture was then heated under reflux. Ammonia was evolved and was absorbed in an amount of 35 parts. There was obtained a solution of the polyhydroxypolyurea containing 78.1% of total solids. The viscosity of a solution adjusted to 50% total solids was E+ on the Gardner-Holdt scale.

*Example 2*

The procedure of Example 1 was followed with use of 292 parts of triethylenetetramine, 309 parts of water, and 185 parts of epichlorohydrin. After the reactants had been mixed with cooling, the reaction mixture was heated for three hours at 90°–95° C. The solution of polyhydroxypolyalkylenepolyamine hydrochloride thus obtained had a polyamine content of 51.2% and a viscosity of Q+ on the Gardner-Holdt scale.

A portion of 300 parts of the above solution was treated with 61 parts of aqueous 50% sodium hydroxide solution. There was then added urea in an amount of 91.5 parts. This is a ratio of 0.5 mole of urea per —NH— group. Water was taken off under reduced pressure and then the mixture was heated at 100° to 120° C. with evolution of ammonia. There was thus formed polyhydroxypolyalkylenepolyurea. A 43% aqueous solution thereof had a viscosity of C at 25° C. on the Gardner-Holdt scale. The product as obtained contained 78% of polyurea and sodium chloride. From an ash determination it was found that the solution contained 9% of sodium chloride. The salt was separated by taking up the product as obtained with methanol, filtering, and evaporating the filtrate to yield the polyhydroxypolyalkylenepolyurea as a resinous residue.

*Example 3*

In the same way there were reacted epichlorohydrin and triethylenetetramine in a mole ratio of 1.38:1 to give a solution containing 47.6% of polyhydroxypolyalkylenepolyamine, said solution having a viscosity of $Z_4$ at 25° C. This polyamine was reacted with urea in a ratio of one mole of urea per —NH— group. A 43.9% solution of the polyurea therefrom had a viscosity of V+ at 25° C. on the Gardner-Holdt scale. The product as obtained was a solution of 66% of polyhydroxypolyalkylenepolyurea and 12% of sodium chloride.

*Example 4*

By the same procedure there were reacted together at 20° to 100° C. epichlorohydrin and tetraethylenepentamine in a 1:1 ratio. A solution of the resulting polyamine hydrochloride at 50.8% of polyamine had a viscosity of U at 25° C. The hydrochloride was destroyed with caustic solution and the polyamine was reacted for three hours under reflux with urea in a ratio of 1:1 for urea per —NH— group. A 45% solution of the resulting polyurea in water had a viscosity of B. The product as obtained was a solution containing 76.3% of the polyurea, 8.5% of sodium chloride, and 15.2% of water.

*Example 5*

The above procedure was followed with epibromohydrin and tetraethylenepentamine in a 1.2:1 ratio. The resulting solution contained 50% of the polyhydroxypolyamine and had a viscosity of V— at 25° C. The intermediate product was neutralized and treated at 115° C. for three hours with urea in a ratio 1:1 per —NH— group. A 44.3% solution of the resulting polyurea in water had a viscosity of F at 25° C. The product as obtained contained 84% of total solids, the polyurea content being 70%.

*Example 6*

The above procedure was repeated with epichlorohydrin and tetraethylenepentamine in a 1.25:1 mole ratio. A solution of the resulting polyamine hydrochloride at 51.3% of the polyamine had a viscosity of $Z_4$ at 25° C. This was treated with caustic soda solution and reacted with urea in a ratio of one mole of urea per —NH— group. A 44.3% solution of the resulting polyurea had a viscosity of W— at 25° C. The product as obtained contained 70.3% of the polyurea and 8.5% of sodium chloride.

*Example 7*

In the same way epichlorohydrin and diethylenetriamine were reacted at temperatures up to about 100° C. in a ratio of 1.33:1. The resulting polyhydroxypolyamine as the hydrochloride imparted a viscosity of $Z_3+$ to an aqueous solution containing 52.8% of the polyamine. After treatment with caustic soda solution and reaction with urea in a 1:1 ratio, the final polyhydroxypolyalkylenepolyurea had a viscosity of I+ at 25° C. at a level of 37.8% of the product. The product, a polyurea, was obtained as a 60% solution in water.

*Example 8*

In the same way there were reacted at 20° to 100° C. epichlorohydrin and ethylenediamine in a 1.18:1 mole ratio. The solution containing 54.3% of the polyhydroxypolyalkylenepolyamine (as the hydrochloride) had a viscosity of $Z_7$ at 25° C. After reaction of hydrochloride and caustic soda the above polyamine was reacted with urea in a ratio of 1:1 of urea per —NH—group. A 38.3% solution of the resulting polyurea in water had a viscosity of M— at 25° C. The product as obtained was a solution of 62% of the polyurea and 19% of sodium chloride.

The probable structure of the polyurea may be regarded as

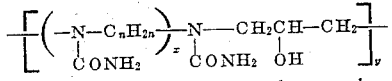

where $n$ is an integer from two to three, $x$ is an integer from one upwards, being one less than the number of amino groups in the alkylene polyamine, and $y$ is the number equal to the number of units in the polyhydroxypolyalkylenepolyurea products. This number appears to vary from two to one hundred or more. Some of the hydroxyl groups may react with urea. It is probable that the polyureas are formed as a mixture of different molecular sizes.

We claim:

1. A process for preparing polyhydroxypolyalkylenepolyureas which comprises reacting between about 0° and 100° C. in the presence of water epichlorohydrin and an alkylene polyamine having two to three carbon atoms in the alkylene portion thereof in a mole ratio from 1:1 to 1.4:1 until an aqueous solution of the resulting polyhydroxypolyalkylenepolyamine at a concentration of about 46% has a viscosity from J to $Z_7$ at 25° C. on the Gardner-Holdt scale and reacting said polyhydroxypolyalkylenepolyamine with urea between 100° and 200° C. with evolution of ammonia in a ratio from 0.5:1 to 1.8:1 of urea per —NH—group of said polyhydroxypolyalkylenepolyamine until an aqueous 45% solution of the resulting polyhydroxypolyalkylenepolyurea has a viscosity from B to $Z_3$ at 25° C. on the Gardner-Holdt scale.

2. A process for preparing polyhydroxypolyalkylenepolyureas which comprises reacting between about 0° and 100° C. in the presence of an inert volatile solvent epichlorohydrin and an alkylene polyamine having two to three carbon atoms in the alkylene portion thereof in a mole ratio from 1:1 to 1.4:1 yielding soluble reaction products, continuing this reaction until an aqueous solution of the resulting polyhydroxypolyalkylenepolyamine hydrochloride at a polyamine content of about 46% has a viscosity of J to $Z_7$ at 25° C. on the Gardner-Holdt scale, neutralizing the hydrochloride portion thereof, and reacting the polyhydroxypolyalkylenepolyamine with urea between 100° and 200° C. with evolution of ammonia, the ratio of moles of urea to —NH—group of said polyhydroxypolyalkylenepolyamine being from 0.5:1 to 1.8:1, and continuing this reaction until an aqueous 45% solution of the resulting polyhydroxypolyalkylenepolyurea has a Gardner-Holdt viscosity at 25° C. of B to $Z_3$.

3. A process for preparing polyhydroxypolyalkylenepolyureas which comprises reacting between about 0° C. and 100° C. in the presence of water epichlorohydrin and a polyethylenepolyamine in a mole ratio from 1:1 to 1.4:1 yielding soluble reaction products, continuing this reaction until an aqueous solution of the resulting polyhydroxypolyalkylenepolyamine hydrochloride at a polyamine content of about 46% has a viscosity from T to $Z_4$ at 25° C. on the Gardner-Holdt scale, neutralizing the hydrochloride portion thereof, and reacting the polyhydroxypolyalkylenepolyamine with urea between 100° and 200° C. with evolution of ammonia until an aqueous solution containing about 45% of the resulting polyhydroxypolyalkylenepolyurea has a Gardner-Holdt viscosity at 25° C. of F to Z, the ratio of urea to —NH— group of said polyhydroxypolyalkylenepolyamine in the reaction mixture being from 0.5:1 to 1.8:1.

4. The process of claim 3 in which the polyethylenepolyamine is diethylenetriamine.

5. The process of claim 3 in which the polyethylenepolyamine is triethylenetetramine.

6. The process of claim 3 in which the polyethylenepolyamine is tetraethylenepentamine.

7. The product of the process of claim 3.
8. The product of the process of claim 4.
9. The product of the process of claim 5.
10. The product of the process of claim 6.

References Cited in the file of this patent

UNITED STATES PATENTS

| | | |
|---|---|---|
| 2,155,328 | Paquin | Apr. 18, 1939 |
| 2,501,783 | Morgan | Mar. 28, 1950 |
| 2,554,475 | Suen et al. | May 22, 1951 |
| 2,573,956 | Daniel et al. | Nov. 6, 1951 |

FOREIGN PATENTS

| | | |
|---|---|---|
| 530,267 | Great Britain | Dec. 9, 1940 |